INVENTOR
LOUIE A. GALLOWAY, JR.

ATTORNEYS

April 15, 1969
L. A. GALLOWAY, JR
3,438,364
BARBECUE GRILL AND THE LIKE
Filed May 16, 1966
Sheet 2 of 2
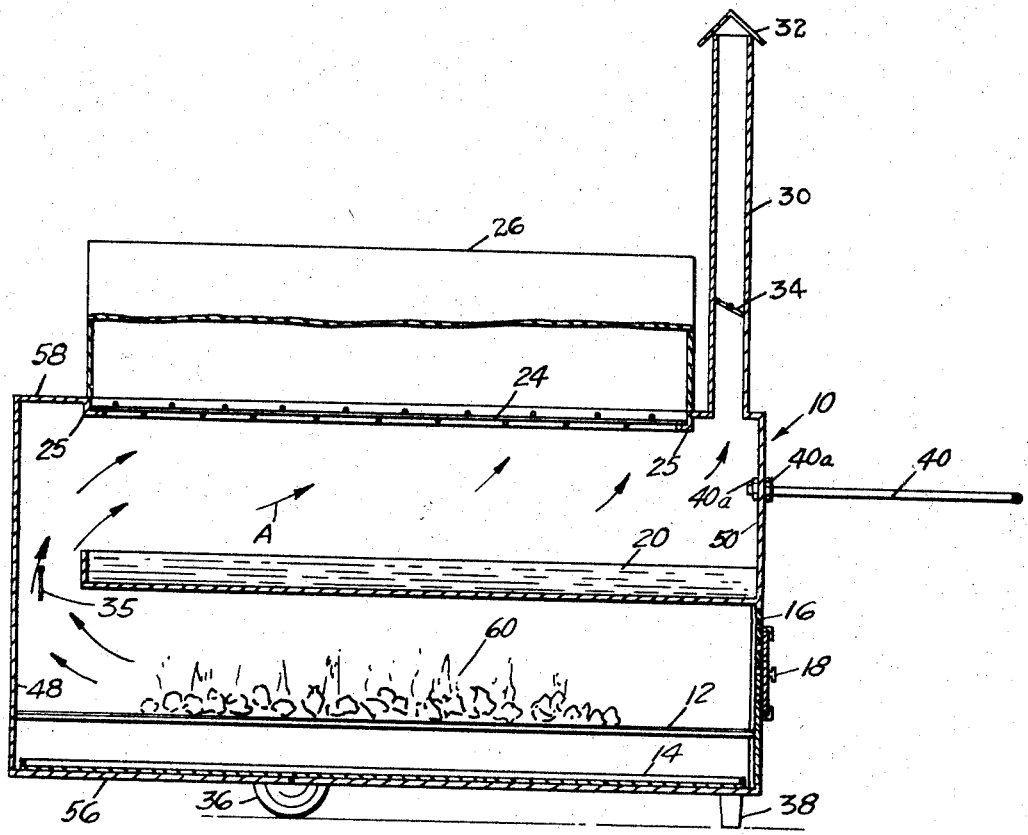
Fig. 3
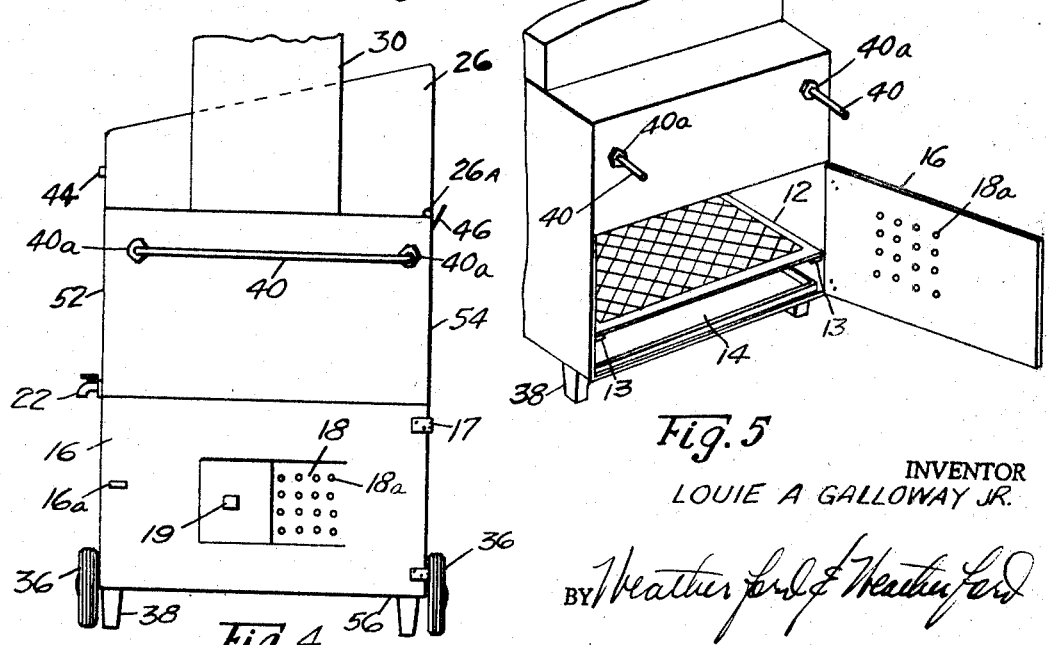
Fig. 4
Fig. 5
INVENTOR
LOUIE A GALLOWAY JR.
BY Weatherford & Weatherford
ATTORNEYS

United States Patent Office 3,438,364
Patented Apr. 15, 1969

3,438,364
BARBECUE GRILL AND THE LIKE
Louie A. Galloway, Jr., 1601 W. 15th St.,
Pine Bluff, Ark. 71601
Filed May 16, 1966, Ser. No. 550,328
Int. Cl. A47j 37/07
U.S. Cl. 126—25    7 Claims

ABSTRACT OF THE DISCLOSURE

A portable barbecue grill or the like which includes an upper grill portion for carrying food to be cooked, a lower fire grate compartment, and a water baffle interposed between the grill and the grate spaced above the grate and spaced below the grill, the water baffle terminating short of one end of the device in an opening which extends from side to side of the device, the water baffle substantially completely blocking the flames in said fire grate from direct contact with the food on the grill, and the flow of heat and smoke passing only through the opening at the end of the baffle into the space below the grill.

Background of the invention

This invention relates to barbecue grills, ovens and the like, and more particularly, to a universal portable grill adapted to use various types of fuels.

Present well known portable barbecue grills are usually so constructed that the cooking area is not protected against dust, rain and the like. Many of these grills have the further disadvantage that only charcoal briquettes may be used therein as cooking fuel. Another disadvantage of these grills is that their cooking areas are in a direct and fixed proximity to the fire area so that only certain types of food may be cooked without having burned or dried out spots thereon.

The present invention overcomes the above disadvantages by providing a new and novel barbecue grill having an adjustable hood above the cooking area, and a lower burner area connected by a flue means to a cooking area, the two areas being separated by a partition including a water jacket which provides steam to the cooking area for tenderizing meat cooked in the upper portion thereof.

Summary of the invention

A primary object of this invention is to provide a new and novel barbecue grill having a return flow of heat therein and in which the drippings from the food either flow through the utility drain or are instantly burned to ash on the hot bottom of the oven, and in which combustion gases are automatically carried off through the smoke stack and do not reenter the food being cooked.

A further object is to provide a new barbecue grill in which the oven damper can be closed to confine heat and smoke in the fire box when the hood is open and to preclude the escape thereof during periodic cooking checks.

A further object is the provision of a grill which conserves the consumption of fuel and tends to maintain a more constant heat distribution.

Another object is to provide a barbecue grill wherein foods are exposed to the same degree of heat and smoke density and will retain their natural juices without being dried out or charred in spots.

A still further object is the provision of an oven or barbecue grill having a temperature indicator installed on the hood so that even a novice user can produce the same delicious food as an accomplished cook by following a few simple directions.

Another object is to provide a new barbecue grill having a multi-purpose water jacket wherein steam acts as a tenderizer, and the excess grease drippings are drained through the bottom of the water jacket to facilitate cleaning of the grill.

A further object is the provision of a barbecue grill which will operate equally effectively with all types of fuel.

Another object is to provide a new oven or barbecue grill wherein the cooking space thereof is adaquate for the preparation of complete meals in a single operation and wherein the savory foods and aromas thereof are blended together under one common hood.

Still another object is the provision of a rugged, compact, portable, and inexpensive grill including a water baffle which precludes adjustment between the cooking and fire areas thereof.

A further object is to provide a barbecue grill having a smokestack cap and damper for effectively controlling the amount of smoke escaping from the grill during hickory smoking of meats and the like.

In one aspect of the invention, a barbecue grill may be generally constructed of sheet iron, aluminum, stainless steel or the like, mounted on two wheels and have a pair of legs at one end for stability and support thereof. This new unit may include a shelf handle of sufficient size to facilitate its movement and this handle may be additionally used with a conventional cooking board as a work shelf. This grill may be provided with two separate longitudinal compartments or sections, wherein the lower section houses the fire box and grate while the upper section constitutes the cooking oven. A hinged hood may be equipped with a supporting arm which automatically adjusts and holds the hood at the desired height. This hood covers the entire cooking grill and when elevated permits free access to the entire food preparation area.

In another aspect of the invention, the housing may be divided by a sheet metal pan partition which completely separates the two compartments except for an opening which permits smoke and heat to circulate from the fire box into the oven. A damper may be installed in the flue to control the amount of smoke and heat entering the upper compartment thereof. The partition is adapted to hold water therein and be provided with a utility drain, and the partition also serves as a water jacket and heat and smoke baffle between the two areas. In such a compact and efficient barbecue unit, the smoke stack may be equipped with a damper which is so located to fully utilize the natural flow of heat and smoke during cooking. Due to the novel construction of the instant invention it prevents flame flare-up thus insuring safety and protection to operating personnel thereof.

Other objects and advantages will become apparent when considering the following specification in connection with the accompanying drawings wherein:

Brief description of the drawings

FIGURE 3 is a longiudinal sectional view of FIGURE 2 taken substantially on lines 3—3 as indicated;

FIGURE 4 is a partial right elevational view of FIGURE 1; and

FIGURE 5 is a partial perspective view of FIGURE 4 showing the damper door in open position.

Description of the preferred embodiment

Figure 1:
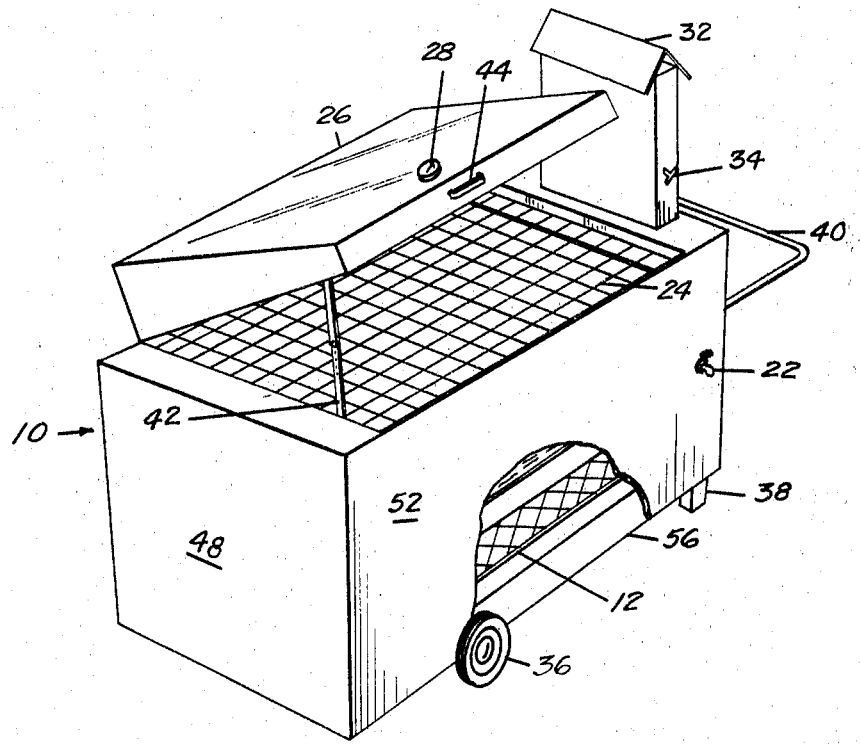
FIGURE 1 is a perspective view of a preferred embodiment of a barbecue grill in which a lower portion is shown partly in section to illustrate the relative positions of the water baffle with respect to the fire grate area therein.
Figure 2:
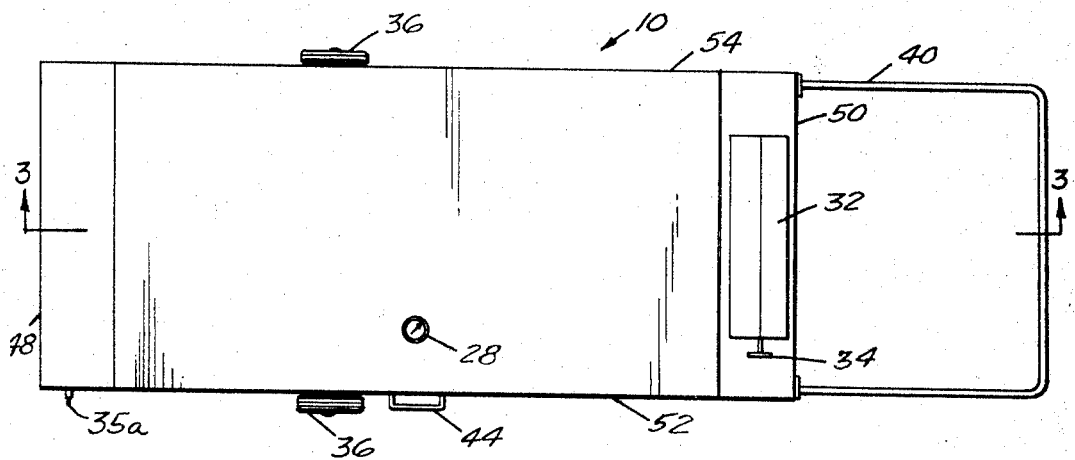
FIGURE 2 is a plan view of FIGURE 1.

Referring more particularly to the drawings, wherein similar reference characters designate like parts throughout the several views, a grill includes a generally rectangular housing 10 having end walls 48–50, side walls 52–54, a bottom 56 and a top wall 58. This housing includes a fire grate 12 slidably supported by ledge means 13 on the side walls in spaced relation above an ash pan 14 so that the grate may be removed therefrom for cleaning purposes. The ash pan 14 is supported by the bottom wall 56 and is removable from the housing to also permit cleaning thereof. Access to the grate and ash pan is afforded by a door 16 which is mounted by hinge means 17 to one side of the housing 10, and a damper 18 is slidably mounted in an aperture 18a in the door so as to be adjustable by actuating a handle 19 formed thereon, as best illustrated in FIGURE 4, for draft controlling purposes.

A relatively shallow water and baffle tray or pan extends from and is supported by one end wall 50 of the housing 10 and extends lengthwise thereof approximately intermediate of the top and bottom walls 58–66 of the housing and in spaced relation above the grate 12. Tray 20 terminates short of the end wall 48 to provide a heat flow passage and damper means 35 laterally disposed within the passage. The damper means 35 being suitably attached upon a rod pivotally mounted at one of its ends in the side wall 52 and at its other end in the side wall 54. The rod end mounted in the side wall 52 is further provided with a handle 35a for optional adjustment of the damper means 35 to control the flow of air from the combustion chamber upwardly through the passage. The tray 20 may be drained by a valved outlet 22 in one wall of the housing. Removably arranged in a recess 25 in the top wall 58 of housing 10 is a cooking grill 24 which is covered by a hood 26 generally conforming in shape to the grill and hingedly mounted at 26a to one edge of the housing top. A stop 46 (FIG. 4) may be provided adjacent the hinge to support the hood in elevated position. The hood 26 may include a temperature register 28 in the top face thereof.

A relatively narrow, rectangular chimney or flue 30 opens into the top of the housing at one end thereof and extends upwardly therefrom, and a weather cap 32 is suitably arranged on the upper end thereof. A damper 34 may also be arranged within the chimney 30 and is provided with the usual manually controlled adjusting means, not shown. The cap 32 prevents backdrafts down the chimney from winds, serves as a weather protector, and prevents flame flareups from inside the housing during cooking. Upon removal of grill 24, cleaning access to tray 20 may be had, in addition to which the supply of water therein may be replenished.

The housing 10 is provided with and supported by a pair of wheels 36 which are suitably journalled on the underside thereof, and supporting legs 38 are preferably arranged on and project downwardly from the bottom wall of the housing at one end thereof. Thus, the device is readily movable by a handle 40 secured by lock nuts 40a and the like to and projecting from one end wall 50 of the housing, with the legs 38 providing the necessary stability. The handle 40 also provides a ready support for a cooking board or shelf, not shown, during use of the grill.

As the hood 26 is hinged at one edge of the housing top, the same may be readily elevated relative to the cooking grill 24 by grasping a handle 44 arranged on and projecting from a downwardly depending flanged side of the hood. The hood may be retained in elevated position by a prop or arm 42, as best shown in FIGURE 1.

When door 16 is opened, briquettes or other suitable fuel 60 may be placed on fire grate 12 and ignited. Baffle tray 20 is filled with water, and dampers 18 and 24 suitably adjusted, and hood 26 is moved to the closed FIGURES 3–4 positions. When indicator 28 indicates that the heat in hood 26 has reached a desired temperature, hood 26 may be manually raised and the prop 42 adjusted to retain the hood in elevated position. Food may then be appropriately positioned on cooking grill 24, after which the hood 26 may again be closed, or slightly spaced from the housing top 58 by adjusting prop 42, depending upon whether baking or broiling is desired. Upon completion of the cooking, hood 26 may be fully opened and supported in that position by stop 46 to permit of final preparation of the food and the serving thereof.

In the operation of the grill, heat and smoke follow a return course, as indicated by the arrows A of FIGURE 3, from grate 12 to and thence upwardly through chimney 30. Because of this flow of heat, the food will be evenly cooked and will not have burned or dried out sections thereon. In addition, as the water and baffle tray will produce humidity in the form of steam, it thereby insures that the food being cooked will not be dried out.

Having shown and described a preferred embodiment of my portable barbeque grill, it is to be understood that various changes and revisions may be made therein, without departing from the scope and spirit of the appended claims.

What is claimed is:
1. A barbecue grill and oven having a housing including end walls, side walls joining said end walls, a bottom, and a top wall, said grill and oven comprising
  (A) a fire grate mounted within said housing adjacent said bottom,
  (B) grill means for supporting food to be cooked
    (1) mounted in said top wall and
    (2) spaced above said grate,
    (3) said grill means being substantially open for access of convection heat and smoke from said grate,
  (C) water baffle means within said housing, intermediate said grate and said grill means, said water baffle means being spaced above said grate and below said grill means,
    (1) said water baffle means extending from side wall to side wall of said housing, and
    (2) extending from one end wall of said housing
      (a) throughout a majority of the distance between said end walls,
      (b) said water baffle means terminating spaced from the other end wall of said housing and providing a single opening from side wall to side wall of said housing adjacent said other end wall for passage of heat and smoke from said grate across and beneath said grill means,
    (3) said water baffle means shielding said grill means from direct contact with flames from said grate, the water in said water baffle means partially vaporizing to humidify and tenderize food on said grill means, and
    (4) said water baffle means substantially completely blocking the passage of heat and smoke from said grate to said grill means except through said single opening, and
  (D) a chimney, opening into said housing
    (1) through said top wall substantially at the level of said grill means and above said water baffle means,
    (2) said chimney extending upwardly away from said housing adjacent said one end wall and remote from said opening,
    (3) said chimney providing draft means drawing smoke and heat upwardly through said opening and across said grill means.
2. Apparatus in accordance with claim 1, in which said grill means is removable from said housing.
3. Apparatus in accordance with claim 1, which includes a hood attached to said housing and overlying said grill means.

4. Apparatus in accordance with claim 3, in which said hood is hingedly attached to said housing, for movement to and from raised position.

5. Apparatus in accordance with claim 4, which includes a prop extending upwardly from said housing beneath said hood for maintaining said hood in a raised position.

6. Apparatus in accordance with claim 3, in which said chimney includes an adjustable damper therein.

7. Apparatus in accordance with claim 1, which includes support means attached to and depending below said housing, said support means comprising wheel means and leg means, whereby said apparatus is readily portable from place to place.

References Cited

UNITED STATES PATENTS

| | | | |
|---|---|---|---|
| 2,748,691 | 6/1956 | Johnson | 126—25 X |
| 2,792,773 | 5/1957 | Barker. | |
| 2,851,941 | 9/1958 | Cogar. | |
| 2,902,026 | 9/1959 | Hathorn | 126—25 |
| 3,045,582 | 7/1962 | Wells. | |
| 3,087,414 | 4/1963 | Gannon. | |
| 3,151,609 | 10/1964 | Hastings. | |
| 3,274,987 | 9/1966 | Hastings | 126—25 |

FREDERICK KETTERER, *Primary Examiner.*